United States Patent
Davis et al.

(10) Patent No.: US 9,327,260 B2
(45) Date of Patent: *May 3, 2016

(54) INTEGRATED PROCESS FOR STEAM CRACKING

(71) Applicant: ExxonMobil Chemical Patents Inc., Baytown, TX (US)

(72) Inventors: S. Mark Davis, Humble, TX (US); Richard C. Stell, Houston, TX (US); Jiunn-Shyan Liou, Bridgewater, NJ (US); Stephen H. Brown, Annandale, NJ (US); Paul F. Keusenkothen, Houston, TX (US); Arthur R. Di Nicolantonio, Seabrook, TX (US); John J. Waldrop, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 311 days.

This patent is subject to a terminal disclaimer.

(21) Appl. No.: 13/768,640

(22) Filed: Feb. 15, 2013

(65) Prior Publication Data

US 2013/0156656 A1 Jun. 20, 2013

Related U.S. Application Data

(62) Division of application No. 12/833,556, filed on Jul. 9, 2010, now Pat. No. 8,399,729.

(51) Int. Cl.
*B01J 8/18* (2006.01)
*B01J 10/00* (2006.01)
(Continued)

(52) U.S. Cl.
CPC ............... *B01J 10/005* (2013.01); *C10B 55/00* (2013.01); *C10B 55/10* (2013.01); *C10G 9/005* (2013.01);
(Continued)

(58) Field of Classification Search
CPC ................ B01J 8/00; B01J 8/18; B01J 10/00; B01J 10/005; B01J 19/00; B01J 19/24; B04C 7/00; B01D 21/00; B01D 21/26; B01D 21/267; B01D 45/00; B01D 45/12; C10G 9/00; C10G 9/005; C10G 9/34; C10G 9/36; C10G 55/00–55/08; C10G 2300/00; C10G 2300/10–2300/4006; C10G 2400/00; C10G 2400/30; C10G 9/007; C10G 51/00; C10G 51/02; C10G 51/023; C10B 55/00–55/04; C10B 55/08; C10B 55/10
See application file for complete search history.

(56) References Cited

U.S. PATENT DOCUMENTS 2,655,464 A   10/1953  Brown et al.
2,885,350 A * 5/1959   Brown et al. .................. 208/127
(Continued)

FOREIGN PATENT DOCUMENTS

FR          2768154       12/1999
WO          WO 01/66672    9/2001
(Continued)

OTHER PUBLICATIONS

P.J. Ellis and C.A. Paul, Tutorial: Delayed Coking Fundamentals, paper 29a, Topical Conference on Refinery Processing, 1998 Great Lakes Carbon Corporation [online], [retrieved on Jun. 15, 2010]. Retrieved from the Internet <URL: http://www.coking.com/DOCKTUT.pdf>.

*Primary Examiner* — Natasha Young (57) ABSTRACT

This invention relates to a process and system for cracking hydrocarbon feedstock containing vacuum resid comprising: (a) subjecting a vacuum resid to a first thermal conversion in a thermal conversion reactor (such as delayed coker, fluid coker, Flexicoker™, visbreaker and catalytic hydrovisbreaker) where at least 30 wt % of the vacuum resid is converted to material boiling below 1050° F. (566° C.); (b) introducing said thermally converted resid to a vapor/liquid separator, said separator being integrated into a steam cracking furnace, to form a vapor phase and liquid phase; (c) passing said vapor phase to the radiant furnace in said steam cracking furnace; and (d) recovering at least 30 wt % olefins from the material exiting the radiant furnace (based upon the weight of the total hydrocarbon material exiting the radiant furnace).

8 Claims, 2 Drawing Sheets

(51) Int. Cl.

| | | |
|---|---|---|
| *C10B 55/10* | (2006.01) | |
| *C10G 9/00* | (2006.01) | |
| *C10G 9/36* | (2006.01) | |
| *C10G 51/02* | (2006.01) | |
| *C10B 55/00* | (2006.01) | |
| *B01J 19/00* | (2006.01) | |
| *B01J 19/24* | (2006.01) | |
| *B04C 7/00* | (2006.01) | |
| *B01D 21/26* | (2006.01) | |
| *B01D 45/12* | (2006.01) | |
| *C10G 9/34* | (2006.01) | |
| *C10G 51/00* | (2006.01) | |

(52) U.S. Cl.
CPC ............ *C10G 9/007* (2013.01); *C10G 9/36* (2013.01); *C10G 51/023* (2013.01); *C10G 2300/1077* (2013.01); *C10G 2300/301* (2013.01); *C10G 2300/4006* (2013.01); *C10G 2300/807* (2013.01); *C10G 2400/20* (2013.01); *C10G 2400/30* (2013.01)

(56) References Cited

U.S. PATENT DOCUMENTS

| | | | |
|---|---|---|---|
| 3,487,006 A | | 12/1969 | Newman et al. |
| 3,617,493 A | | 11/1971 | Wirth et al. |
| 3,661,767 A | * | 5/1972 | Wirth et al. ............ 208/54 |
| 3,671,424 A | | 6/1972 | Saxton |
| 3,898,299 A | | 8/1975 | Jones |
| 4,065,379 A | | 12/1977 | Soonawala et al. |
| 4,180,453 A | | 12/1979 | Franck et al. |
| 4,210,520 A | | 7/1980 | Wernicke et al. |
| 4,257,871 A | | 3/1981 | Wernicke et al. |
| 4,411,769 A | * | 10/1983 | Oldweiler ............ 208/54 |
| 4,663,019 A | | 5/1987 | Gartside et al. |
| 4,797,197 A | | 1/1989 | Mallari |
| 4,853,105 A | | 8/1989 | Herbst et al. |
| 4,975,181 A | | 12/1990 | Tsao |
| 5,024,751 A | | 6/1991 | Giuliani et al. |
| 5,188,805 A | * | 2/1993 | Sabottke ............ 422/111 |
| 5,413,702 A | | 5/1995 | Yan |
| 5,580,443 A | | 12/1996 | Yoshida et al. |
| 5,952,539 A | | 9/1999 | Seimandi et al. |
| 6,179,993 B1 | | 1/2001 | Seimandi et al. |
| 6,210,561 B1 | | 4/2001 | Bradow et al. |
| 6,632,351 B1 | | 10/2003 | Ngan et al. |
| 7,090,765 B2 | | 8/2006 | Spicer et al. |
| 7,097,758 B2 | | 8/2006 | Stell et al. |
| 7,138,047 B2 | | 11/2006 | Stell et al. |
| 7,138,097 B1 | | 11/2006 | Zones et al. |
| 7,193,123 B2 | | 3/2007 | Stell et al. |
| 7,220,887 B2 | | 5/2007 | Stell et al. |
| 7,481,871 B2 | * | 1/2009 | Frye et al. ............ 96/193 |
| 7,678,264 B2 | | 3/2010 | Bhan |
| 7,718,839 B2 | | 5/2010 | Baumgartner et al. |
| 7,815,791 B2 | | 10/2010 | Keusenkothen |
| 8,197,668 B2 | * | 6/2012 | Ou et al. ............ 208/67 |
| 2004/0039240 A1 | | 2/2004 | Powers |
| 2005/0010075 A1 | | 1/2005 | Powers |
| 2006/0094918 A1 | | 5/2006 | McCoy et al. |
| 2007/0023845 A1 | | 2/2007 | Ohta |
| 2007/0090018 A1 | | 4/2007 | Keusenkothen et al. |
| 2007/0090019 A1 | | 4/2007 | Keusenkothen et al. |
| 2007/0090020 A1 | | 4/2007 | Buchanan et al. |
| 2008/0277314 A1 | | 11/2008 | Halsey |
| 2009/0048475 A1 | | 2/2009 | Powers |
| 2009/0156876 A1 | | 6/2009 | Ou et al. |
| 2009/0272671 A1 | | 11/2009 | Keusenkothen |
| 2010/0174130 A1 | | 7/2010 | Spicer et al. |
| 2010/0300936 A1 | | 12/2010 | Stell et al. |
| 2013/0115143 A1 | * | 5/2013 | Davis et al. ............ 422/162 |

FOREIGN PATENT DOCUMENTS

| | | |
|---|---|---|
| WO | WO 2007/117919 | 10/2007 |
| WO | WO 2007/117920 | 10/2007 |
| WO | WO 2009/025640 | 2/2009 |

* cited by examiner

INTEGRATED PROCESS FOR STEAM CRACKING

CROSS REFERENCE TO RELATED APPLICATIONS

This application is a divisional of U.S. application Ser No. 12/833,556 filed on Jul. 9, 2010, now allowed, and is related to U.S. application Ser No. 12/833,485, filed on Jul. 9, 2010, now granted (U.S. Pat No. 8,361,311) and U.S. application Ser No. 13/723,591, filed on Dec. 21, 2012. This application also relates to U.S. application Ser No. 12/692,222, filed on Jan. 22, 2010.

FIELD OF THE INVENTION

The invention relates to a method of making olefins from a crude or resid-containing crude fraction in a steam cracking furnace or a pyrolysis furnace.

BACKGROUND OF THE INVENTION

Thermal cracking of hydrocarbons is a petrochemical process that is widely used to produce olefins such as ethylene, propylene, butylenes, butadiene, and aromatics such as benzene, toluene, and xylenes. Each of these is a valuable commercial product in its own right. For instance, the olefins may be oligomerized (e.g., to form lubricant basestocks), polymerized (e.g., to form polyethylene, polypropylene, and other plastics), and/or functionalized (e.g., to form acids, alcohols, aldehydes and the like), all of which have well-known intermediate and/or end uses.

Steam cracking, also referred to as pyrolysis, has long been used to crack various hydrocarbon feedstocks into olefins, preferably light olefins such as ethylene, propylene, and butenes. Typically, the feedstock for steam cracking is a hydrocarbon such as naphtha, gas oil, or other non-resid containing fractions of whole crude oil, which may be obtained, for instance, by distilling or otherwise fractionating whole crude oil. Conventional steam cracking utilizes a steam cracking furnace which has two main sections: a convection section and a radiant section. The hydrocarbon feedstock typically enters the convection section of the furnace as a liquid (except for light feedstocks which enter as a vapor) wherein it is typically heated and vaporized by indirect contact with hot flue gas from the radiant section and by direct contact with steam. The vaporized feedstock (and optional steam) mixture is then conveyed into the radiant section where the cracking takes place. Typically the vaporized mixture is introduced through crossover piping into the radiant section where it is quickly heated, at pressures typically ranging from about 10 to about 50 psig (69 to 345 kPa), to a severe hydrocarbon cracking temperature, such as in the range of from about 1450° F. (788° C.) to about 1650° F. (900° C.), to provide thorough thermal cracking of the feedstream. The resulting products, including olefins, leave the steam cracking furnace for further downstream processing.

After cracking, the effluent from the pyrolysis furnace contains a variety gaseous hydrocarbons, e.g., saturated, monounsaturated, and polyunsaturated, and can be aliphatic and/or aromatic, as well as significant amounts of molecular hydrogen. The cracked product is then further processed such as in the olefin production plant to produce, as products of the plant, the various separate individual streams of high purity, i.e., hydrogen, the light olefins ethylene, propylene, butylenes, and aromatic compounds, as well as other products such as pyrolysis gasoline.

As worldwide demand for light olefins increases and the availability of favorable crude sources is depleted, it becomes necessary to utilize heavier crudes (i.e., those having higher proportions of resid), which requires increased capital investments to process and handle the refining byproducts. It is highly desirable to have processes that can take lower cost, heavier crudes, and produce a more favorable product mix of light olefins, more efficiently. However, conventional steam cracking processes are known to be prone to severe fouling by feedstocks containing even small concentrations of resid, which is commonly present in low quality, heavy feeds. Thus, most steam cracking furnaces are limited to processing of higher quality feedstocks which have had substantially all of the resid fraction removed in other refinery processes. Such additional processes increase the cost of the overall process. Likewise, removal of the resid fraction lowers the overall conversion efficiency of the refinery process, since most of the resid fraction is mixed with low value fuel oils, rather than being converted to higher-value materials.

U.S. Patent Published Patent Application No. 2007/0090018, incorporated herein by reference, discloses integration of hydroprocessing and steam cracking. A feed comprising crude or resid-containing fraction thereof is severely hydrotreated and passed to a steam cracker to obtain an olefins product.

Cracking of heavy hydrocarbon feeds in fluidized cokers has been described. For example, U.S. Pat. No. 3,671,424, incorporated herein by reference, discloses a two-stage fluid coking process in which the first stage is a transfer line for short contact time and the second is either a transfer line or a fluidized bed.

The use of knock-out drums integrated with the steam cracking furnace has evolved as an important extension of this platform to enable processing of heavier feedstocks such as atmospheric resids. The knock-out drum provides a means to separate the heaviest components from crackable gas oil molecules and prevent the heaviest, asphaltene-type molecule containing fractions from fouling the steam cracking furnace. Unfortunately, by using this approach, most of the heavy vacuum resid molecules, which are favored as feedstock due to lower cost, remain in the liquid phase and are not converted in the radiant section of the steam cracking furnace.

Other patents of interest include U.S. Pat. Nos. 7,097,758; 7,138,047; 7,193,123; 3,487,006; 3,617,493; 4,257,871; 4,065,379; 4,180,453; 4,210,520; 3,898,299; 5,024,751; 5,413,702; 6,210,561; 7,220,887; US 2007/023845; WO 01/66672; WO 2007/117920; U.S. Pat. No. 6,632,351; U.S. Pat. No. 4,975,181; WO 2009/025640; US 2007/0090018 and WO 2007/117919. Other references of interest include: "Tutorial: Delayed Coking Fundamentals." P. J. Ellis and C. A. Paul, paper 29a, Topical Conference on Refinery Processing, 1998 Great Lakes Carbon Corporation (which can be downloaded from http://www.coking.com/DECOKTUT.pdf).

There remains in the art a need for new means and improved processes for economical processing of heavy, resid-containing feeds for the production of olefins, aromatics, and other valuable petrochemical products. Likewise there remains a need in the art for means to upgrade resid to a more useful and/or efficient composition.

This invention discloses a method for producing chemicals from heavy feedstocks in a manner where significant portions of the vacuum resid are converted to lighter molecules which can be more easily vaporized in the knock-out drum and subsequently converted to fuels and chemicals.

SUMMARY OF THE INVENTION

This invention relates to a process for cracking hydrocarbon feedstock containing resid comprising:

(a) passing a vacuum resid containing hydrocarbon feedstock to a first thermal conversion zone, where the feedstock is heated to a temperature of less than 649° C. (1200° F.), where at least 30 wt % of the vacuum resid is converted to material boiling below 566° C. (1050° F.);

(b) introducing said thermally converted resid to a vapor/liquid separator (such as a knock-out drum), said separator being in fluid communication with (e.g., integrated into) a steam cracking furnace, to form a vapor phase and liquid phase;

(c) passing said vapor phase to the radiant furnace in said steam cracking furnace; and (d) recovering at least 30 wt % olefins from the material exiting the radiant furnace (based upon the weight of the total hydrocarbon material exiting the radiant furnace).

In another embodiment, this invention relates to a process for cracking hydrocarbon feedstock containing resid comprising:

(a) heating a hydrocarbon feedstock containing resid;

(b) passing said heated hydrocarbon feedstock to vapor/liquid separator (such as a knock-out drum);

(c) flashing said heated hydrocarbon feedstock in said separator to form a vapor phase and a liquid phase containing said resid;

(d) passing at least a portion of said resid-containing liquid phase from said separator to a thermal conversion reactor operating below 649° C. (1200° F.), and optionally containing coke particles;

(e) passing said thermally converted resid-containing liquid phase to a vapor/liquid separator (such as a knock-out drum), said separator being in fluid communication with (e.g., integrated into) a steam cracking furnace, to form a second vapor phase and second liquid phase;

(f) passing said second vapor phase to the radiant furnace in said steam cracking furnace; and (g) recovering at least 30 wt % olefins from the material exiting the radiant furnace (based upon the weight of the total hydrocarbon material exiting the radiant furnace).

In another embodiment, the liquid phase exiting the first vapor/liquid separator is further heated to a temperature such as 1000 to 1200° F. (538-649° C.), typically in the lower coils of the convection section of a steam cracker, typically a portion of the heated material typically is visbroken, thereafter water (such as steam) is used to quench and vaporize the visbroken materials the reaction, the vaporized visbroken material is then passed to a second vapor/liquid separator where the visbroken material is separated into a liquid phase and a vapor phase. The vapor phase is then introduced into a steam cracker (either in the convection section or the radiant section) and where at least 30 wt % olefins are recovered from the material exiting the radiant furnace (based upon the weight of the total hydrocarbon material exiting the radiant furnace).

Advantageously, the initial hydrocarbon feedstock typically contains between 10 wt % and 50 wt % of resid boiling at 566° C.$^+$, preferably about 20-40 wt %, and the process described herein enables a high fraction of this resid to be converted to chemicals.

In a preferred embodiment, the resid containing liquid from the second vapor/liquid separator is not processed further for producing chemicals. Instead this material is preferably used as a blendstock into fuel oil or for further refinery processing for producing fuels.

In a preferred embodiment this invention relates to a process for cracking hydrocarbon feedstock containing vacuum resid comprising:

(a) heating a hydrocarbon feedstock containing at least 1 wt % vacuum resid, based upon the weight of the hydrocarbon feedstock, and converting at least 10 wt % of the vacuum resid to material boiling below 566° C.;

(b) passing said heated hydrocarbon feedstock to a vapor/liquid separator (preferably the liquid bottoms phase from the vapor/liquid separator is heated to a temperature of 593 to 649° C.);

(c) flashing said heated hydrocarbon feedstock in said separator to form a vapor phase and a liquid phase containing said resid;

(d) passing at least a portion of said resid-containing liquid phase from said separator to a first thermal conversion zone (preferably containing coke particles, preferably the zone has a coke particle/fresh feed ratio(wt/wt) of at least 1:1 (preferably at least 3:1, preferably at least 5:1, alternately from 1:1 to 50:1, preferably from 3:1 to 30:1), based on the weight of circulating coke solids and fresh feed entering the zone) to thermally convert at least a portion of said resid-containing liquid phase;

(e) passing said thermally converted liquid phase to a vapor/liquid separator, said separator being in fluid communication with a steam cracking furnace, to form a second vapor phase and second liquid phase;

(f) passing said second vapor phase to said steam cracking furnace to thermally convert at least a portion of said second vapor phase (alternately the second vapor phase can be used as fuel or blendstock); and (g) recovering at least 30 wt % olefins from the material exiting the radiant furnace of said steam cracking furnace (based upon the weight of the total hydrocarbon material exiting the radiant furnace).

BRIEF DESCRIPTION OF THE DRAWINGS

In the Figures below, similar apparatuses and/or process steps are identified with like numbers.

DETAILED DESCRIPTION OF THE INVENTION

This invention involves integration of a heavy feed steam cracker including an integrated vacuum resid vapor/liquid separator (e.g., knock-out drum) with a thermal conversion unit, such as a delayed coker, fluid coker, FLEXICOKER™, visbreaker, or catalytic hydrovisbreaker, where vacuum resid is converted to lighter components that are suitable for steam cracking ("Suitable for steam cracking" means that the materials can be cracked in a steam cracker.) By closely integrating the two conversion processes, the overall process is able to efficiently convert a much wider range of heavy feeds to high value chemicals while minimizing fouling. For purposes of this invention a steam cracking furnace (also referred to as a "steam cracker") is a pyrolysis furnace that has two main sections or furnaces: a convection section and a radiant section, where hydrocarbon feedstock enters the less severe convection section of the furnace as a liquid (except for light feedstocks which enter as a vapor) and where the feedstock is heated and vaporized typically by indirect contact with hot flue gas from the radiant section and is optionally contacted with steam. The vaporized feedstock and steam mixture is then conveyed into the radiant section where it is quickly heated, at pressures typically ranging from about 10 to about 50 psig (69 to 345 kPa-gauge), to a severe hydrocarbon cracking temperature, such as in the range of from about 1450° F. (788° C.) to about 1650° F. (900° C.), to provide thorough thermal cracking of the feedstream. The resulting products typically comprise olefins, aromatics and dienes.

Resid as used herein refers to the complex mixture of heavy petroleum compounds otherwise known in the art as residuum or residual. Atmospheric resid is the bottoms product produced in atmospheric distillation when the endpoint of the heaviest distilled product is nominally 650° F. (343° C.), and is referred to as 650° F.$^+$ (343° C.$^+$) resid. Vacuum resid is the bottoms product from a column under vacuum when the heaviest distilled product is nominally 1050° F. (566° C.), and is referred to as 1050° F.$^+$ (566° C.$^+$) resid. (The term "nominally" means here that reasonable experts may disagree on the exact cut point for these terms, but probably by no more than +/−50° F. or at most +/−100° F.) This 1050° F.$^+$ (566° C.$^+$) portion contains asphaltenes, which traditionally are considered to be problematic to the steam cracker, resulting in severe fouling and potentially corrosion or erosion of the apparatus. The term "resid" as used herein means the 650° F.$^+$ (343° C.$^+$) resid and 1050° F.$^+$ (566° C.$^+$) resid unless otherwise specified; note that 650° F.$^+$ resid comprises 1050° F.$^+$ resid. According to this invention, at least a portion of the 650° F.$^+$ resid, up to at least the 1050° F.$^+$ boiling point fraction, is vaporized, such as when combined with steam, and/or when the pressure is reduced or flashed in the knock-out drum of the steam cracker. The terms "vacuum resid containing hydrocarbon feedstock", "atmospheric resid containing hydrocarbon feedstock", "resid containing hydrocarbon feedstock" and the like, mean that the identified resid is present at least 0.1 wt %, based upon the weight of the hydrocarbon feedstock (preferably at least 1 wt %, preferably at least 10 wt %, preferably at least 15 wt %, preferably at least 20 wt %).

The terms "flash drum", "flash pot", "knock-out drum" and knock-out pot" are used interchangeably herein; they are known in the art, meaning generally, a vessel or system to separate a liquid phase from a vapor phase (a "vapor/liquid separator"). The term "flash" means generally to effect a phase change for at least a portion of the material in the vessel from liquid to vapor, via a reduction in pressure and/or an increase in temperature. An integrated knock-out drum is a vapor/liquid separator that is in fluid communication with a steam cracker. Specifically, the integrated knock-out drum is in fluid communication with the convection section of a steam cracker, where feedstock is heated (optionally mixed with superheated steam) and transferred to said knock-out drum operating as a vapor/liquid separator, thereafter the vapors from the knock-out drum are returned to the steam cracker, preferably either to the convection or radiant section, or both. The addition of steam may further assist flash separation by reducing the hydrocarbon partial pressure, assist in conversion and vaporization of the 750° F.$^+$ (399° C.$^+$) to 1050° F.$^+$ (566° C.$^+$) (preferably even a substantial portion of the 1100° F.$^+$ (593° C.$^+$)) resid fractions, and prevent fouling.

The preferred flash drums or vapor/liquid separation devices, and their integration with pyrolysis units have previously been described in U.S. Pat. Nos. 7,090,765, 7,097,758, and 7,138,047, which are incorporated herein by reference. Another apparatus effective as a flash drum for purposes of the present invention is described in U.S. Pat. No. 6,632,351 as a "vapor/liquid separator".

The vapor/liquid separator operates at a temperature and pressure where those portions of the feed material that cause coking are kept in a liquid state, preferably operates at a temperature of between about 375 to 525° C., preferably from 400 to 500° C., preferably from 800° F. (about 425° C.) and about 870° F. (about 465° C.), but also typically not over about 900° F. (about 482° C.).

According to the invention a crude oil or fraction thereof containing resid is utilized as a feedstock for a steam cracking furnace. Suitable lower value feeds may typically include heavier crudes, defined as those hydrocarbon feedstocks that have a low API gravity as a result of high concentrations of 650° F.$^+$ (343° C.$^+$) resid, high sulfur, high Total Acid Number (TAN), high naphthenes, high aromatics, and/or low hydrogen content.

Crude, as used herein, means whole crude oil as it issues from a wellhead, production field facility, transportation facility, or other initial field processing facility, optionally including crude that has been processed by a step of desalting, treating, and/or other steps as may be necessary to render it acceptable for conventional distillation in a refinery. Crude as used herein is presumed to contain resid.

Crude fractions are typically obtained from the refinery pipestill. Although any crude fraction obtained from the refinery pipestill may be useful in the present invention, a significant advantage offered by the present invention is that crude or crude fractions still containing all or a portion of the original 1050° F.$^+$ (566° C.$^+$) resid present in the whole crude obtained from the wellhead may be used as feed for a steam cracker. In one embodiment, the crude or other feedstock to the present system may comprise at least about 1 wt % 1050° F.$^+$ (566° C.$^+$) resid, preferably at least about 5 wt % 1050° F.$^+$ (566° C.$^+$) resid, and more preferably at least about 10 wt % 1050° F.$^+$ (566° C.$^+$) resid up to about 50 wt % 1050° F.$^+$ (566° C.$^+$) resid.

Resid typically contains a high proportion of undesirable impurities such as metals, sulfur, and nitrogen, as well as high molecular weight ($C_{12}^+$) naphthenic acids (measured in terms of TAN according to ASTM D-664, TAN refers to a total acid number expressed as milligrams ("mg") of KOH per gram ("g") of sample). Yet another advantage of the present invention is that feeds high in one or more of these impurities may be readily processed. In some embodiments, this invention can be practiced on 566° C. resid having: one or more (preferably two, three, four, five, six or seven) of the following properties: 1) 50 ppm of Ni or more, alternately 100 ppm or more, alternately 125 ppm or more, based upon the weight of the 566° C.$^+$ resid; and/or 2) 200 ppm vanadium or more, alternately 500 ppm or more, alternately 900 ppm or more, based upon the weight of the 566° C.$^+$ resid; and/or 3) 4 wt % sulfur or more, alternately 5 wt % or more, alternately 6 wt % or more, based upon the weight of the 566° C.$^+$ resid; and/or 4) a TAN of at least 0.1, alternately at least 0.3, alternately from about 0.1 to about 20, about 0.3 to about 10, or about 0.4 to about 5; and/or 5) an API gravity of 19 or less (ASTM D6822, 15.5° C.); and/or 6) a $C_5$ asphaltenes content of at least 0.04 grams of $C_5$ asphaltenes per gram of resid ("$C_5$ asphaltenes" refers to asphaltenes that are insoluble in pentane as determined by ASTM Method D2007); and/or 7) a kinematic viscosity at 37.8° C. of at least 10 cSt (as determined by ASTM D445). Example resids that can be used herein are the 566° C.$^+$ resids obtained from crudes including, but not limited to, crudes from of the following regions of the world: U.S. Gulf Coast, southern California, north slope of Alaska, Canada tar sands, Canadian Alberta region, Mexico Bay of Campeche, Argentinean San Jorge basin, Brazilian Santos and Campos basins, Egyptian Gulf of Suez, Chad, United Kingdom North Sea, Angola Offshore, China Bohai Bay, China Karamay, Iraq Zagros, Kazakhstan Caspian, Nigeria Offshore, Madagascar northwest, Oman, Netherlands Schoonebek, Venezuelan Zulia, Malaysia, and Indonesia Sumatra. Additional resids useful herein include 566° C.$^+$ resids obtained from crude oils described as "disadvantaged" in U.S. Pat. No. 7,678,264, incorporated by reference herein.

In a preferred embodiment, wherein the feed comprises crude or atmospheric resid that contain appreciable amounts of 1050° F.$^+$ (566° C.$^+$) resid, e.g., 10 wt % or more of 1050° F.$^+$ (566° C.$^+$) resid, or 20 wt % or more of 1050° F.$^+$ (566° C.$^+$) resid, or 30 wt % or more of 1050° F.$^+$ (566° C.$^+$) resid, or 40 wt % or more of 1050° F.$^+$ (566° C.$^+$) resid, or even up to 50 wt % of 1050° F.$^+$ (566° C.$^+$) resid, the resid-containing feed is passed into a first steam cracking furnace with integrated knock-out drum.

Bottoms from a first knock-out drum are then passed into a thermal conversion Unit such as a delayed coker, fluid coker, FLEXICOKER™, visbreaker or catalytic hydrovisbreaker, where it is heated and at least 30 wt % (based upon the weight of the feed) of the vacuum resid is converted to a 1050° F.$^-$ (566° C.$^-$) cut. As used herein a 1050° F.$^-$ (566° C.$^-$) cut is defined to be hydrocarbons normally boiling below 1050° F.$^-$ (566° C.$^-$). The thermally converted resid is introduced to a knock-out drum, said drum being integrated into a steam cracking furnace, to form an overhead vapor phase and liquid bottoms phase. Said vapor phase is passed to the radiant furnace in said steam cracking furnace. At least 30 wt % olefins are recovered from the material exiting the radiant furnace (based upon the weight of the total hydrocarbon material exiting the radiant furnace). The addition of steam may further assist flash separation by reducing the hydrocarbon partial pressure, assist in conversion and vaporization of the 750° F.$^+$ (399° C.$^+$) to 1150° F.$^+$ (621° C.$^+$) resid fractions, and prevent fouling.

The fluid coker preferably includes an integrated air gasifier (or partial oxidation reactor) which is used to convert coke to fuel gas by steam/air gasification and combustion at between about 1400-1800° F. (760-982° C.). This gasification can be facilitated by cofeeding oxygen or by using oxygen enriched air. Hot, partially gasified coke from this gasification reaction is continuously withdrawn from the gasifier and fed to one or more solids transfer lines where it is contacted with the bottoms material recovered from one or more steam cracking furnaces equipped with integrated vapor/liquid separators (such as knock-out drums). This residual oil fraction is converted at 1300-1800° F. (704-982° C.) to a mixture of lighter hydrocarbons containing high concentrations of ethylene and propylene. While the transfer line reactors can be configured in several ways, a preferred configuration is similar to that used in fluid catalytic cracking units; e.g., the transfer line is operated as a vertical riser reactor where the hot solids are contacted with feed near the bottom of the riser, the solids and vapor are transported upward along the riser, and the solids and vapor are separated using one or more cyclones in series. Alternatively the transfer line can be operated as "downer" or downflow reactor. Irrespective of the specific configuration, the transfer line reactor is highly effective for contacting hot coke with the residual oil.

Alternatively, vacuum resid from a refinery (already cut out of the crude) can be passed directly into the resid conversion unit and then used as feedstock for a steam cracking furnace equipped with an integrated knock-out drum.

Preferably, the flash drum preferably operates at a temperature of from about 800° F. (about 425° C.) and about 870° F. (about 465° C.), but also typically not over about 900° F. (about 482° C.). Flashing material through the flash drum to obtain an overhead vapor and liquid bottoms further facilitates vaporization of the 650° F.$^+$ (343° C.$^+$) resids.

Steam cracking alone provides for a product comprising significant yields of fuel oil, tar, and SCN (steam cracked naphtha) in addition to the desired ethylene, propylene, butylenes, $C_5$ olefins and dienes, and single-ring aromatic products. The instant process is particularly effective and advantageous for steam cracker integrations because the process achieves a much higher level of resid conversion to chemicals without fouling and it minimizes the need for cooling and reheating the intermediate product streams.

Liquid products produced in resid thermal cracking can produce high yields of chemicals in the steam cracker and show reduced tendency (versus the 1050° F.$^+$ (566° C.$^+$) resid) for fouling the steam cracking furnace.

This invention further relates to a process for producing chemicals from heavy feedstocks in a manner where more of the vacuum resid is largely converted to fuels and chemicals. Generally, the process involves integration of a heavy feed steam cracker including an integrated vacuum resid knock-out drum with a secondary thermal conversion reactor where vacuum resid is converted to lighter components that are suitable for steam cracking. The secondary thermal conversion reactor is normally operated in a similar time/temperature window as conventional visbreaking and coking processes, although it can be advantageous to operate at somewhat milder conditions than are normally employed for producing fuels. In an embodiment, in the processes described herein, the thermal conversion reactor operates at 25° C. or more (alternately 50° C. or more, alternately 75° C. or more) below the operating temperature of the furnace section of the steam cracker following the thermal conversion reactor. In some embodiments it is preferable to cascade the lighter liquids and gases through the radiant section of the steam cracker without condensation. By closely integrating the two conversion processes, one operating at milder severity and one operating at high severity, the process is able to convert a much wider range of heavy feeds to high value chemicals. (When a reactor or reaction zone is stated to be "operating at" a certain temperature it means that material in the reactor or zone has been heated to that temperature.)

In the figures and description below reference to a knock-out drum may be taken to generally refer to any vapor/liquid separator device.

Figure 1:
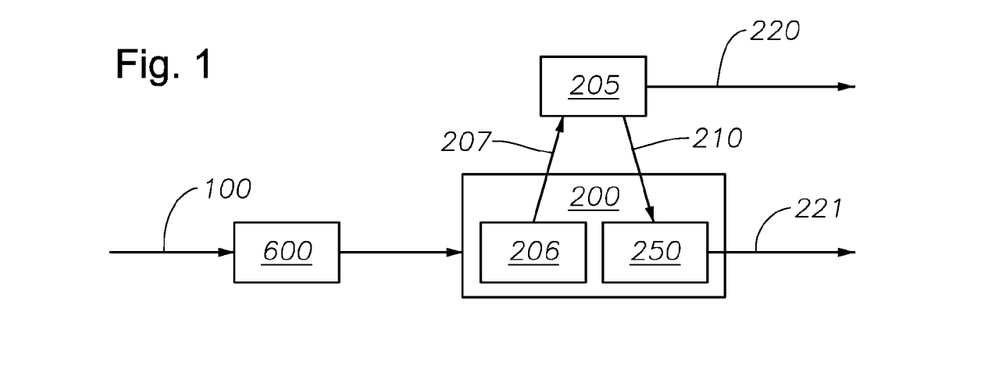
FIG. 1 is a flow diagram of an embodiment of the present invention process.

A basic flow scheme for the process of the invention is shown in FIG. 1, where a hydrocarbon feedstock (containing atmospheric resid) 100 is introduced to a first thermal conversion reactor 600 where at least 30 wt % (preferably at least 50%, preferably at least 70%, preferably about 90%) of the resid is converted to a 1050° F.$^-$ (566° C.$^-$) cut and/or petroleum coke. The whole liquid and vapor product is then introduced (207) to a knock-out drum 205 (typically operating at 800 to 900° F. (423 to 482° C.)), said drum being in fluid communication with (e.g., integrated into) a steam cracking furnace 200 (having a convection furnace 206 and a radiant furnace 250) to form an overhead vapor phase 210 and liquid bottoms phase 220. The vapor phase 210 is then passed to the radiant furnace 250 in said steam cracking furnace 200, either directly or via a heater, such a transfer line heater or a convection section 206 of the steam cracker 200, where the radiant section is typically operating at 750 to 900° C., and at least 30 wt % (preferably 40% or more) of the radiant section feed is converted to light olefins (e.g., $C_2$, $C_3$ $C_4$) which are recovered from the material exiting the radiant furnace 221 (based upon the weight of the total hydrocarbon material exiting the radiant furnace).

Figure 2:
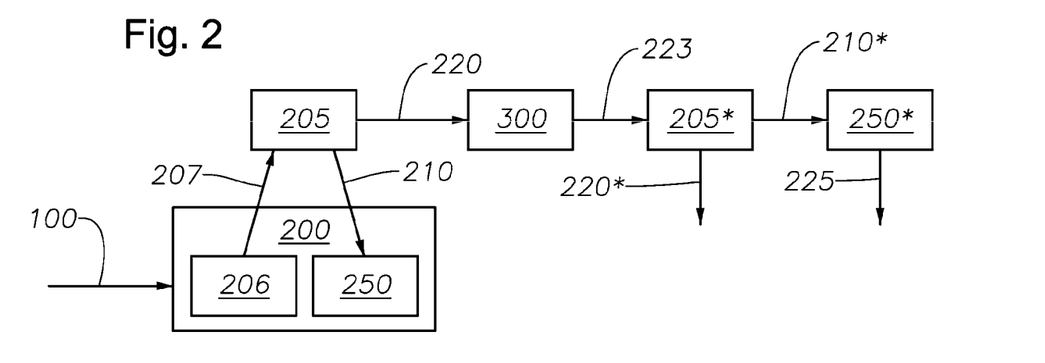
FIG. 2 is a flow diagram of an embodiment of the present invention process.

Another basic flow scheme for the process of the invention is shown in FIG. 2, where a resid containing hydrocarbon feedstock 100 is heated (typically in the convection furnace 206 of a steam cracker furnace) and, preferably, at least 10 wt % (preferably at least 20 wt %, preferably at least 25 wt %, alternately from about 20-30%) of the vacuum resid is converted to a 1050° F.⁻ (566° C.⁻) cut. The whole feed is heated to about 750-850° F. (399-454° C.). The heated feedstock is then passed 207 to a knock-out drum 205 (preferably integrated into a steam cracker furnace), typically operating at 800 to 900° F. (423 to 482° C.). The heated feedstock is then separated (typically in the flash drum by centrifugal forces and gravity settling of coalesced liquid droplets) to form an overhead vapor phase 210 and a liquid bottoms phase 220 containing said resid. The liquid bottoms phase 220 is then passed to a thermal conversion reactor 300, optionally containing coke particles, where it is more highly converted into lighter molecules 223 boiling below 1050° F. (566° C.). The lighter molecules 223 are then passed to a knock-out drum 205*(typically operating at 800 to 900° C.), said drum preferably being integrated into a steam cracking furnace, to form a second overhead vapor phase 210* and second liquid bottoms phase 220*. The overhead vapor phase 210* is then passed to the radiant furnace 250* (typically operating at 750 to 900° C.), in a steam cracking furnace, preferably the steam cracking furnace that the knock-out drum 205* is integrated with. Thereafter at least 30 wt % (preferably at least 40% light olefins (e.g., $C_2$, $C_3$, $C_4$ olefins) are recovered from the material exiting the radiant furnace 225 (based upon the weight of the total hydrocarbon material exiting the radiant furnace).

Figure 3:
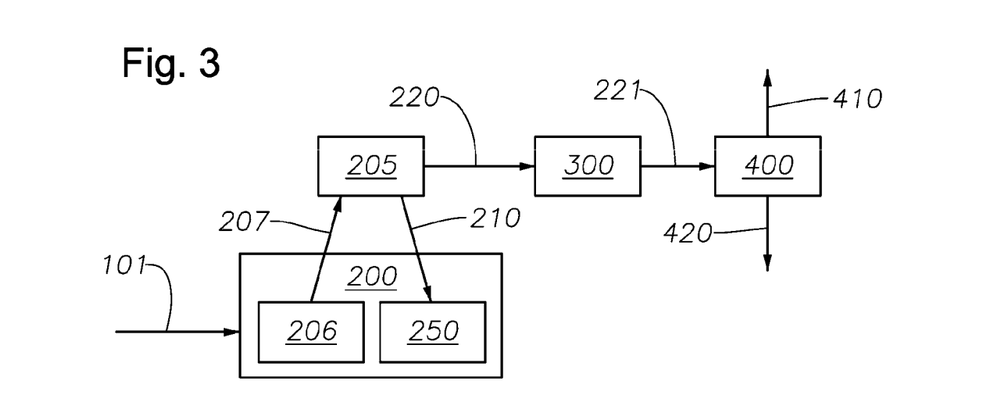
FIG. 3 is a flow diagram of an embodiment of the present invention process.

Another basic flow scheme for the process of the invention is shown in FIG. 3. A heavy feedstock crude or vacuum resid 101 (preferably containing about 10 to 50% molecules boiling in the vac resid range (1050° F.⁺ (566° C.⁺)) 100 is fed to a first steam cracking furnace 200 which includes an integrated knock-out drum 205. The whole feed is heated to about 750-850° F. (399-455° C.) in the convection section 206 of the furnace. The whole feed passes 207 into the knock-out drum separation device 205 where molecules boiling below about 1000-1100° F. (538-593° C.) are vaporized (or remain vaporized) and are separated from heavier compounds which remain in the liquid phase. Material typically enters the drum at a temperature of about 800-850° F. (427-454° C.) and vaporization is facilitated by the use of steam stripping or stripping with light hydrocarbons. The vapors pass overhead 210 into the radiant section 250 of the first steam cracking furnace, whereas the heavy liquids are withdrawn from the bottom of the knock-out drum 220. The heavy liquid molecules are then directed to a secondary conversion reactor 300 where the heavy liquids are thermally cracked into lighter molecules. The light molecules then pass 221 to a drum separation device 400 integrated in a steam cracker furnace (not shown) where molecules boiling below about 538-593° C. are vaporized (or remain vaporized) and are separated from heavier compounds which remain in the liquid phase. Material typically enters the drum at a temperature of about 427-470° C. and vaporization is facilitated by the use of steam stripping or stripping with light hydrocarbons. The vapors pass overhead through line 410 into the radiant section (not shown) of a steam cracking furnace, whereas the bottoms are withdrawn from the bottom of the knock-out drum through line 420. Steam may be introduced into the steam cracking furnace (not shown). Bottoms 420 from the knock-out drum may be used for fuel oil, among other things. In a preferred embodiment, the material exiting the thermal conversion reactor is not reintroduced into the first steam cracker.

Preferably heavy liquids from several knock-out drum equipped furnaces are preferably combined to achieve better economy of scale in the secondary vacuum resid conversion reactor. The secondary conversion reactor can be directly coupled with the steam cracking furnace and can take the form of a delayed coker drum, a fluid coker, a FLEXI-COKER™, a visbreaker, a catalytic hydrovisbreaker, or other suitable conversion reactor designs. Optionally, the feed can be further preheated to about 800-900° F. (427-482° C.) before entering the coking reactor by reheating in a reboiler or furnace or by contacting with a hot gas such as steam or hydrogen. In the secondary conversion reactor, a high fraction of the vacuum resid molecules (e.g., above about 50%) are thermally cracked into lighter molecules which boil below 1050° F. (566° C.). Once through conversion of the vacuum, resid molecules are normally in the range of 30-60% in visbreaking or up to 95% or more in once through catalytic hydrovisbreaking or coking. This is accomplished by balancing the reaction temperature and residence time with stripping of lighter liquid products in the conversion vessel which is operated adiabatically. To maintain hydrogen balance at high levels of resid conversion or with lower hydrogen content feeds, a significant fraction of the heavy vacuum resid molecules are converted to a solid coke product with low hydrogen content or to heavier tar-like bottoms fractions. In a catalytic hydrovisbreaker, in addition to producing a heavier, tar-like bottoms fraction with low hydrogen content, hydrogen is added to feed heteroatoms to produce $H_2S$, $NH_3$, and $H_2O$ and to cracked olefinic fragments to prevent coking In the delayed coker case, the reaction is continued until the drum gradually fills with solid coke. The feed is then switched to a second drum, while coke is removed from the first drum, and the process is continued in a cyclic manner. In a preferred embodiment, vapor and liquid product from the coking reaction are fed to a second steam cracking furnace incorporating an integrated knock-out drum. This furnace may be operated with a slightly lower knock-out drum temperature or cut point as compared to the first furnace (or group of furnaces used to supply the coker feed), preferably the second knock-out drum operates at 25° C. or more (preferably 50° C. or more, preferably 75° C. or more) below the operating temperature of the first knock-out drum. Lighter molecules generated in the coking (or secondary conversion) reactor remain vaporized and pass into the radiant section of the steam cracker, whereas the heavier vacuum gas oil (VGO) molecules and material that was not converted in the coker are withdrawn from the bottom of the second knock-out drum. In a preferred embodiment, these molecules are disposed by other means, for example blending into fuel oil, and are not recycled back to the coker as is normally practiced in fuels coking processes. In another preferred embodiment, hot vapor overhead from the coker can be partially quenched using a cooler VGO or distillate stream between the outlet of the coker and the inlet of the knock-out drum in order to promote further condensation of heavier VGO components with lower hydrogen content.

While vacuum resid coking and gas oil steam cracking are well known processes, the integration of a coker with a steam cracking furnace including an integrated knock-out drum is not known. Moreover, it is normally preferred to operate cokers with bottoms recycle to extinction to maximize yields of lighter fuel components or fuel feedstocks. This bottom recycle operation produces highly refractory compounds, such as heptane insoluble polynuclear aromatics hydrocarbons, which are not suitable for chemical feeds. Particularly unsuitable feedstocks are molecules containing four or more condensed aromatic rings. Fuel cokers are normally equipped with a large primary fractionator which is used to preheat fresh feed by mixing with coker products and to scrub the coker vapor of entrained liquid droplets by mixing coker feedstock with the coker drum vapor stream. Bottoms reenter the reactor with this fresh feed. In the integrated steam cracking process, this primary fractionator is eliminated.

In the practice of this invention, the integrated knock-out drum is particularly efficient and effective with regards to the operation of heavy feed steam cracking and coking processes without fouling, as it allows cut points between the vapor and heavy liquids to be easily varied consistent with the properties of the feedstock.

A particularly preferred configuration is the direct integration of a thermal cracking process with a steam cracker. By direct integration is meant that that the steam cracker convection section heats the feed to the thermal conversion device and the effluent of the thermal conversion device passes directly to the knock-out drum and then to the radiant section without passing through any intermediate heat exchangers.

Preferred thermal conversion reactors for use herein include delayed cokers, fluid cokers, FLEXICOKERs™, visbreakers and catalytic hydrovisbreakers.

A preferred basic configuration for the thermal conversion reactor is similar to a delayed coker. Specifically the process: i) operates at a slightly lower severity (e.g., from 800 to 900° F. (427-482° C.), preferably 800 to 850° F. (427-454° C.), ii) uses about 0.1 to 1.0 kg of steam per kg of resid feedstock, iii) operates coke drums at lower hydrocarbon vapor partial pressures and/or shorter vapor residence times, iv) separates coking vapors from entrained heavy liquids in an integrated knock-out drum device, and v) preferably operates once through without bottoms recycle. Delayed coking is described in an article by P. J. Ellis and C. A. Paul entitled "Tutorial: Delayed Coking Fundamentals." paper 29a, Topical Conference on Refinery Processing, 1998 Great Lakes Carbon Corporation (which can be downloaded from http://www.coking.com/DECOKTUT.pdf). In a delayed coker, the product vapors and entrained liquids are heat exchanged with colder feed by direct contact in a drum that functions as a distillation tower. This drum typically operates at close to 50 psig (345 kPa). This technique results in an extinction recycle of heavy coker liquids resulting in complete conversion to vapors exiting the drum serving as the distillation tower and coke accumulating in the coke drums. The preheated liquid feed exiting the bottom of the drum serving as a distillation tower and heat exchanger is typically at 360 to 400° C. This hot liquid is passed through a pump which raises the liquid pressure to 300 to 600 psig (2.1 to 4.1 MPa). The hot pressurized feed flows through the coker furnace where it is heated to close to 500° C. The furnace effluent close to 500° C. and 60 psig (414 kPa) flows into the coke drum which separates solid coke from vapors and entrained liquid droplets. The volatile components can then be removed and passed to steam cracker (preferably a steam cracker having an integrated knock-out drum), leaving coke behind. The material passed to the steam cracker is then converted into olefins.

In another embodiment, the liquid phase from the first vapor/liquid separator is heated in a heating zone (such as a delayed coker) to coking temperatures (such as up to 649° C.) and is then conducted to a coking zone wherein volatiles are collected overhead and coke is formed. Preferably the liquid phase from the first vapor/liquid separator is subjected to delayed coking which involves the thermal decomposition of petroleum resid to produce gas, liquid streams of various boiling ranges, and coke. In the delayed coking process, the liquid phase from the first vapor/liquid separator is rapidly heated in a fired heater or tubular furnace, then the heated liquid phase from the first vapor/liquid separator is then passed to a coking drum that is maintained at conditions under which coking occurs, generally at temperatures above about 400° C. under super-atmospheric pressures. The heated feed in the coker drum also forms volatile components that are removed and passed to steam cracker (preferably a steam cracker having an integrated knock-out drum), leaving coke behind. The material passed to the steam cracker is then converted into olefins.

If a catalytic hydrovisbreaking reactor is used as the thermal conversion reactor 300, the heavy oil is mixed with catalyst (such as a metal sulfide) and a molecular hydrogen-containing gas (e.g., $H_2$, syngas, fuel gas) and a high fraction of the vacuum resid molecules, such as at least about 60%, even between about 60-80%, or even up to 95%, are converted into lighter molecules which boil below 1050° F. (566° C.). Typical operating conditions include temperatures of 785-900° F. (418-482° C.), residence times of 2-100 minutes (0.1 to 5 LHSV (Liquid Hourly Space Velocity)), hydrogen treat rates of 500-5000 SCF/B, and operating pressures of 100-3000 psig (0.689-20.7 MPa). Preferred conditions are about 785-860° F. (418-460° C.), 10-40 min (0.2 to 2 LHSV), 1000-2500 SCF/B, and 500-1500 psig (3.45-17.2 MPa). Typical reactor designs include a coil reactor, a coil reactor combined with a pumparound soaker, or a slurry bubble column with liquids recirculation, although other designs are possible. In general, the reaction conditions are optimized to match feed quality; e.g., lower quality feeds may require more severe conditions to achieve high conversions in the range of 50-95%, preferably about 60-80%. Conventional facilities (high and low pressure separators) are used to remove vapor and liquid products after the reactor and to recycle unused hydrogen to the process. Catalysts used in the catalytic hydrovisbreaking process are normally based on sulfided transition metals. The most common metals are Mo, Ni, and Co. When the process is operated as a slurry, catalysts are normally based on micrometer or sub micrometer sized metal sulfide particles dispersed in a carbonaceous matrix (a.k.a Microcat®). The Microcat® can be based on molybdenum sulfide; other transition metal sulfides such as those produced from tungsten, vanadium, iron, nickel, and cobalt; or molybdenum sulfide in combination with one or more of these alternative transition metal sulfides, or combinations of the alternative transition metal sulfides. While molybdenum alone provides satisfactory operations for many feeds, use of other metals or multimetallic catalyst systems can provide improved performance for resid conversion, hydrogen addition, and desulfurization, e.g., higher catalytic activity. Fresh catalyst is typically formed by mixing a heavy VGO cut with a low cost catalyst precursor such as ammonium heptamolybdate or phosphomolybdic acid and heating to 600-800° F. (316-427° C.) for 10-60 minutes. Catalyst pre-forming is preferably carried out in the presence of hydrogen and $H_2S$ or elemental sulfur. The Microcat® produced in this manner is stable over many cycles of conversion, filtration, and reuse. However, the catalyst can deactivate over long times. For this reason, it may be advantageous to remove a small purge stream from the process. This "spent" catalyst can be regenerated in separate facilities or reformulated into fresh catalyst precursor. When the process is operated in a fixed bed, conventional fixed bed catalysts commonly used for fixed bed resid hydrodesulfurization (the production of low sulfur fuel oil from feeds comprising 650+ resid), FCC feed pretreatment, and heavy feed hydrocrackers are employed.

The FLEXICOKING™ processes useful herein were developed by Exxon in the 1960s and are described in detail in a wide range of previous patents as well as textbooks on resid processing technologies. For example, U.S. Pat. No. 3,671,424, incorporated herein by reference, describes and illustrates a suitable fluidized coking apparatus and process for use herein. A FLEXICOKER™ is a form of fluidized coker that includes an integrated air gasifier (or partial oxidation reactor) for gasifying fluidized coke.

In another embodiment, the liquid phase exiting the first vapor/liquid separator is further heated to a temperature such as 1000 to 1200° F. (538 to 649° C.), preferably 1100 to 1200° F. (593 to 649° C.), preferably about 1125 to 1190° F. (607 to 643° C.), typically in the lower coils of the convection section of a steam cracker, where typically a portion of the heated material typically is visbroken, thereafter water (such as steam) is used to quench and vaporize the visbroken materials. The vaporized visbroken material is then passed to a second vapor/liquid separator where the visbroken material is separated into a second liquid phase and a second vapor phase. The second vapor phase is then introduced into a steam cracker (either in the convection section or the radiant section, or both) and at least 30 wt % olefins (preferably 40% or more, preferably 50 wt % or more) are recovered from the material exiting the radiant furnace (based upon the weight of the total hydrocarbon material exiting the radiant furnace).

Generally, kinetic and heat of reaction calculations show that almost complete visbreaking conversion is attained when resids are exposed to 1200° F. (649° C.) for roughly 2 seconds. But because visbreaking is an endothermic reaction, just heating rapidly to 1200° F. (649° C.) is not sufficient. During the subsequent visbreaking, the resid cools to such an extent that roughly 60% conversion of 950° F.$^+$ (510° C.$^+$) to 950° F.$^-$ (510° C.$^-$) occurs. Higher temperatures increase visbreaking conversion, but secondary coking reactions also occur. Thus, in a preferred embodiment, the bottoms from the first knock-out drum are heated to 1000-1200° F. (538 to 649° C.) (preferably from 1100 to 1200° F. (593 to 649° C.), preferably to about 1200° F. (649° C.)) rapidly in the lower convection section where flue heat continually replaces endothermic heat losses. To minimize fouling in the convection section the bottoms are heated in only one pass so that the high velocity of the resid continually washes coke precursors off of the internal surfaces. If some coking does occur, periodic steam/air decoking will burn/spall it off the tubes.

In an alternate embodiment, the convection tubes can be porous sintered metal surrounded by a solid outside tube where steam is in the annulus. The steam pressure is higher than the process pressure causing steam to seep though the sintered inner tube preventing coke laydown.

The visbroken bottoms (e.g., 1000-1200° F. (538 to 649° C.)) are then quenched rapidly upon exiting the convection section otherwise the extra residence time may cause excessive coking. Steam and/or water are excellent quench mediums because they reduce the hydrocarbon partial pressure vaporizing a significant fraction of the newly formed light hydrocarbons. Note, during this quenching operation ample liquid is present, which prevents coking. In the vapor phase, two-molecule coking reactions are not favored (than the liquid phase) because the hydrocarbon concentration is low. In a preferred embodiment, any fouling that may still occur in the vapor phase is prevented by quenching to ~840° F. (449° C.). In an optional embodiment, a portion of the bottoms from the primary knock-out drum can aid in the quenching operations.

In another embodiment, a small second knock-out drum separates visbroken light-hydrocarbons from remaining resid. Like the first knock-out drum, the piping to the second drum coalesces the remaining liquid, which then separates from the hydrocarbon vapor/steam mixture in the drum. By operating the second drum at ~840° F. (449° C.) fouling in the vapor phase will be low. Thus, the vapor can be conveyed either to the first knock-out drum or to the first drum's overhead piping. Alternatively, the vapor/liquid from the quench can be directed to the piping upstream of the first knock-out drum eliminating the need for a second knock-out drum. Further a dual knock-out drum design allows the bottoms from the first knock-out drum to be severely visbroken just once, reducing the likelihood of severe coking Note, the secondary knock-out drum temperature is not so high (nor the hydrocarbon partial pressure so low) that the bottoms will not flow and/or can not be fluxed.

Steam tracing typically further reduces vapor phase fouling. Coker tests show that superheating coke gas to as high as 1250° F. (677° C.) minimizes fouling in cyclones, presumably by prevent liquid deposition the primary coking mechanism. Thus, a preferred embodiment of the present invention is to prevent liquid deposition by steam tracing with superheated steam all vessels and lines downstream of the vapor/liquid separations. The tracing steam, which is significantly hotter than the process vapor, eliminates cold spots that may exist if these lines are only insulated. Even hotter steam can be used to superheat the vapor to a limited extent. If necessary, some of the tracing steam can be injected directly into the vapor to providing further superheating.

Figure 4:
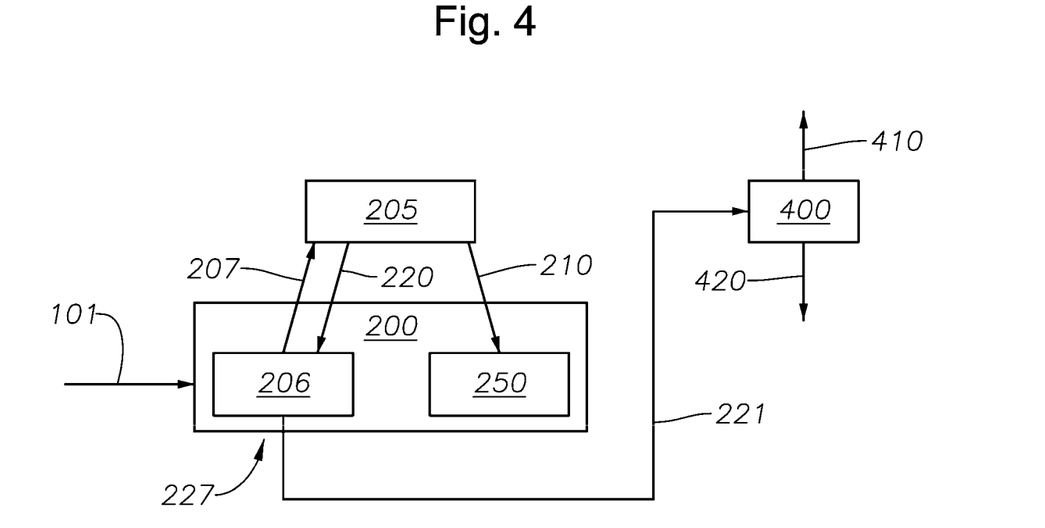
FIG. 4 is a flow diagram of an embodiment of the present invention process.

A significant advantage of the present invention is high utilization of heavy feeds without excessive coking Another basic flow scheme for the process of the invention is shown in FIG. 4. A heavy feedstock crude or resid 101 (preferably containing about 10 to 50% molecules boiling in the vac resid range (1050° F.$^+$ (566° C.$^+$)) is fed to a first steam cracking furnace 200 which includes an integrated knock-out drum 205. The whole feed is heated to about 800 to 900° F. (427 to 482° C.) in the convection section 206 of the furnace. The whole preheated feed 207 passes into the knock-out drum separation device 205 where molecules boiling below about 1000-1100° F. (538-593° C.) are vaporized (or remain vaporized) and are separated from heavier compounds which remain in the liquid phase. Material typically enters the drum at a temperature of about 800-850° F. (427-454° C.) and vaporization is facilitated by the use of steam stripping or stripping with light hydrocarbons. The vapors pass 210 into the radiant section 250 of the first steam cracking furnace, whereas the heavy liquids are withdrawn from the bottom of the knock-out drum 220. The heavy liquid molecules are then directed to the convection section 206 of the furnace (either by mixing with fresh feed or passing into a separate heating coil zone) where the heavy liquids are visbroken into lighter molecules. Water or steam 227 is introduced to vaporize the lighter molecules (typically outside the convection section). The visbroken light molecules then pass 221 to a knock-out drum separation device 400 integrated in a steam cracker furnace (not shown) where molecules boiling below about 538-593° C. are vaporized (or remain vaporized) and are separated from heavier compounds which remain in the liquid phase. The vapors pass 410 into the radiant section (not shown) of a steam cracking furnace, whereas the bottoms are withdrawn from the bottom of the knock-out drum through line 420. Steam may be introduced into the steam cracking furnace (not shown). Bottoms 420 from the knock-out drum may be used for fuel oil, among other things. In a preferred embodiment, the material exiting the thermal conversion reactor is not reintroduced into the first steam cracker.

In a preferred embodiment, the residual vacuum resid material remaining after primary conversion and separation in the knock-out drum is not recycled for additional conversion to chemicals. This residual material contains highly refractory compounds, such as heptane insoluble polynuclear aromatics hydrocarbons, which are not preferred for chemical feeds. These residual molecules are better utilized by blending into fuel oil or optionally by converting in separate refinery resid conversion equipment to produce fuels.

In another embodiment, the vacuum resid feed converted in this invention contains greater than 10.0 wt % hydrogen, preferably greater than 11.0 wt %.

In another embodiment, the feed into the thermal conversion reaction (such as a coker or delayed coker) contains greater than 10.0 wt % hydrogen, preferably greater than 11.0 wt %, preferably greater than 11.5 wt %, based upon the weight of the feed.

In another embodiment, the temperature of the gas exiting the thermal conversion reactor (such as a coker or delayed coker) is 750 to 900° F. (399 to 482° C.), preferably 780 to 860° F. (416 to 460° C.), preferably 800 to 850° F. (427 to 454° C.). In another embodiment, the pressure in the thermal conversion reactor is up to 30 psig (207 kPa), preferably up to 25 psig (172 kPa), preferably from 1 to 20 psig (138 kPa).

In a preferred embodiment, the hydrocarbon feedstock is not cooled when passing from the convection section of the first steam cracking furnace to the integrated first knock-out drum. By not cooled is meant that the mixed flow of feedstock liquid and vapor preferably does not drop in temperature by more than 30° C. (alternately by not more than 50° C., alternately by not more than 100° C.). Likewise in another embodiment, the hydrocarbon feedstock is not cooled when passing from the convection section of the second steam cracking furnace to the integrated second knock-out drum.

In another embodiment of the processes described herein the thermally converted material (such as resid or liquid bottoms phase) is passed to the convection section of a steam cracker prior to entering the integrated knock-out drum.

In another embodiment, molecular hydrogen (typically a molecular hydrogen containing gas) is added to the heated feedstock at any point in the process.

In another embodiment, steam can be added to the heated feedstock at any point in the process. This can be especially useful to assist vaporization in the integrated knock-out drum zones.

In a particularly preferred embodiment, the thermal conversion reactor operates at 649° C. or less, preferably 640° C. or less, preferably 630° C. or less.

In a particularly preferred embodiment, the thermal conversion reactor is a delayed coker operating with low severity conditions (e.g., temperature less than 860° F. (460° C.) and pressure of 30 kPa or less) and the output from the delayed coker is transferred directly into a knock-out drum, preferably the output from the delayed coker is transferred to a knock-out drum integrated into a steam cracker (the output from the delayed coker may be put through the convection section of the steam cracker before it is transferred to the integrated knock-out drum). In this scheme, the feed to the delayed coker is heated in the convection section of the steam cracker and the effluent from the delayed coker drum flows directly in the knock-out pot that is integrated with the steam cracker radiant section. A given coke drum can be integrated to supply feed to one or more steam cracker furnaces equipped with integrated knock-out drums. Integration of a multiple coke drums with one or more furnaces and knock-out pots is also possible. Instead of one drum, there could be two or three drums in parallel. One drum would be on stream and the others would be being emptied of coke.

In a particularly preferred embodiment, vacuum resid is passed into a steam cracker convection section, then passed to a vapor/liquid separator (where the vapor/liquid separator is in fluid communication with the steam cracker, particularly the convection section of the steam cracker), thereafter the resid is converted into a vapor phase and a liquid phase. The vapor phase is passed into the same or different steam cracker in the radiant or convection section, or both. The liquid phase is passed to a thermal conversion zone, such as a coker, delayed coker, FLEXICOKER™, catalytic visbreaker or a catalytic hydrovisbreaker, where it is converted into a vapor or liquid stream and coke. The vapor or liquid stream then passed into the convection section of a steam cracker (preferably a steam cracker different from the first steam cracker) and thereafter passed to a vapor/liquid separator (where the vapor/liquid separator is in fluid communication with the steam cracker, particularly the convection section of the steam cracker), and thereafter the heated vapor or liquid stream is converted into a vapor phase and a liquid phase and said vapor phase is passed into the same or different steam cracker in the radiant or convection section, or both.

In another embodiment, this invention relates to:

1. A process for cracking hydrocarbon feedstock containing vacuum resid comprising:
    (a) passing a vacuum resid containing hydrocarbon feedstock to a first thermal conversion zone where the feedstock is heated to a temperature of less than 649° C. (e.g. operating at less than 649° C.), where at least 30 wt % of the vacuum resid is converted to material boiling below 566° C.;
    (b) introducing said thermally converted resid to a vapor/liquid separator, said separator being in fluid communication with a steam cracking furnace, to form a vapor phase and liquid phase;
    (c) passing said vapor phase to said steam cracking furnace; and
    (d) recovering at least 30 wt% olefins from the material exiting the radiant furnace of the steam cracking furnace (based upon the weight of the total hydrocarbon material exiting the radiant furnace).

2. The process of paragraph 1, wherein the liquid bottoms phase from the vapor/liquid separator of step (b): is brought (e.g. heated or cooled) to a temperature of 538 to 649° C. (alternately, less than 649° C.) to visbreak at least a portion of the liquid bottoms phase; thereafter the visbroken liquid bottoms phase is quenched and subsequently passed to a second Vapor/liquid separator, where the visbroken liquid bottoms phase is separated into a second liquid phase and a second vapor phase; thereafter the second vapor phase is then introduced into the steam cracking furnace of step (c).

3. A process for cracking hydrocarbon feedstock containing vacuum resid comprising:
    (a) heating a hydrocarbon feedstock containing vacuum resid and converting at least 10 wt% of the vacuum resid to material boiling below 566° C.;
    (b) passing said heated hydrocarbon feedstock to a vapor/liquid separator;
    (c) flashing said heated hydrocarbon feedstock in said separator to form a vapor phase and a liquid phase containing said resid;
    (d) passing at least a portion of said resid-containing liquid phase from said separator to a first thermal conversion zone;
    (e) passing said thermally converted liquid phase to a vapor/liquid separator, said separator being in fluid communication with a steam cracking furnace, to form a second vapor phase and second liquid phase;
    (f) passing said second vapor phase to said steam cracking furnace to thermally convert (at least a portion of) said second vapor phase; and
    (g) recovering at least 30 wt % olefins from the material exiting the radiant furnace of said steam cracking furnace (based upon the weight of the total hydrocarbon material exiting the radiant furnace).

4. The process of paragraph 3, wherein the liquid phase from step (c): is heated to a temperature of 538 to 649° C. to visbreak at least a portion of the liquid phase; thereafter the visbroken liquid phase is quenched and subsequently passed to a another vapor/liquid separator, where the visbroken liquid phase is separated into a visbroken liquid phase and a visbroken vapor phase; thereafter the visbroken vapor phase is then introduced into the thermal conversion zone of step (d).

5. The process of any of paragraphs 1 to 4, wherein the liquid bottoms phase in claim 1 from the vapor/liquid separator of step (b) in claim 1 or the or the liquid phase from step (c) in claim 2 is heated to a temperature of 593 to 649° C.

6. The process of any of paragraphs 1 to 5, wherein the thermal conversion zone contains coke particles, where the zone has a coke particle/fresh feed ratio (wt/wt) of at least 1:1 (preferably at least 3:1, preferably at least 5:1, alternately from 1:1 to 50:1, preferably from 3:1 to 30:1), based on the weight of circulating coke solids and fresh feed entering the zone.

7. The process of any of paragraphs 1 to 5, wherein the thermal conversion zone is a delayed coker, a fluid coker, a FLEXICOKER™, a visbreaker or a catalytic hydrovisbreaker.

8. The process of any of paragraphs 1 to 5, wherein the thermal conversion zone is a delayed coker.

9. The process of any of paragraphs 1 to 8, wherein the thermal conversion zone operates at 25° C. or more below the operating temperature of the furnace section of the steam cracker following the thermal conversion zone.

10. The process of any of paragraphs 1 to 9, wherein the vacuum resid feed contains greater than 10.0 wt % hydrogen.

11. The process of any of the above claims, wherein the feed into the thermal conversion zone contains greater than 11.0 wt % hydrogen.

12. The process of any of paragraphs 1 to 11, wherein the temperature of the gas exiting the thermal conversion zone is 399 to 482° C.

13. The process of any of paragraphs 1 to 12, wherein the thermally converted resid of claim 1 is passed to the convection section of a steam cracker prior to entering the vapor/liquid separator.

14. The process of any of paragraphs 2 to 13, wherein thermally converted liquid phase of claim 2 is passed to the convection section of a steam cracker prior to entering the vapor/liquid separator.

15. The process of any of paragraphs 1 to 14, wherein hydrogen or steam is added to the heated feedstock at any point in the process.

16. The process of any of paragraphs 1 to 15, wherein the steam cracker convection section heats the feed to the thermal conversion zone and the effluent of the thermal conversion zone passes directly to the vapor/liquid separator and then to the radiant section of the steam cracker without passing through any intermediate heat exchangers.

17. The process of any of paragraphs 1 to 16, wherein at least 40 wt % olefins are recovered from the material exiting the radiant furnace (based upon the weight of the total hydrocarbon material exiting the radiant furnace).

18. The process of any of paragraphs 1 to 17, wherein the first thermal conversion zone is a fluid coker.

19. The process of any of paragraphs 1 to 18, wherein the first thermal conversion zone is a catalytic hydrovisbreaker.

20. The process of any of paragraphs 1 to 19, wherein the first thermal conversion zone is a hydrovisbreaker operating at a temperature of 400 to less than 649° C.

21. A system for cracking hydrocarbon feedstock containing vacuum resid comprising:

a) a first thermal conversion zone operating at a temperature of less than 649° C. selected from the group consisting of: a delayed coker, a fluid coker, a FLEXICOKER™, a visbreaker or a catalytic hydrovisbreaker, said first thermal conversion zone in fluid communication with b) a steam cracking furnace having a vapor/liquid separator in fluid communication with said furnace.

22. The system of paragraph 21, further comprising a second a vapor/liquid separator in fluid communication with said thermal conversion zone.

23. The system of paragraph 21 or 22, wherein the first thermal conversion zone is a fluidized coker comprising:
  i) a fluidized bed gasifier,
  ii) a transfer line reactor comprising a hydrocarbon feed inlet in fluid communication with a lower portion of said separator, and a pyrolysis product outlet line,
  iii) a solids conduit connecting a lower portion of said fluidized bed gasifier with said transfer line reactor, and
  iv) at least one cyclone separator having an inlet connected to said pyrolysis product outlet line, a cracked product outlet at a top portion of said cyclone separator, and a solids outlet at the bottom of said cyclone separator.

24. The system of paragraph 23, further comprising an air/steam inlet at the bottom of said fluidized bed gasifier.

25. The system of paragraph 23 or 24, wherein said fluidized coker further comprises a fluidized bed heater vessel, having recirculating solids conduits connecting lower portions of said heater vessel and said gasifier, and at least one gas conduit connected between an upper portion of said gasifier and the lower portion of said heater vessel.

26. The system of any of paragraphs 23 to 25, wherein said cyclone separator solids outlet is connected to either or both of said fluidized bed gasifier or said heater vessel.

27. The system of any of paragraphs 23 to 26, comprising two solids conduits connecting lower portions of said heater vessel and said gasifier.

28. The system of any of paragraphs 23 to 27, wherein said transfer line reactor is a vertical riser reactor, wherein said solids conduit and said hydrocarbon feed inlet are connected to a lower portion of said reactor.

29. The system of any of paragraphs 23 to 28, wherein said transfer line reactor is a downflow reactor wherein said solids conduit and said hydrocarbon feed inlet are connected to an upper portion of said reactor.

EXAMPLES

A series of three vacuum resids with variable quality and hydrogen content were subjected to coking conditions as summarized in Table 1. The coking conditions were chosen to be milder in severity than normal practice in order to maximize 1050° F. cut liquid products with reduced light gas production. Products from the coking reaction were analyzed to determine the yields of naphtha, distillate, and gas oil and to determine basic liquid product qualities (gravity, hydrogen content, etc).

Steam cracking process simulation models were then used to estimate the yields of chemical products that can be produced from the full boiling range coker product. Selected steam cracker product yields are highlighted in Table 2. It can be readily seen that this coking plus steam cracking process enables production of a high yield of chemical products from the vacuum resid including ethylene, propylene, and butenes. High olefin yields are favored when the starting vacuum resid has a higher hydrogen content in the range of 11-12 wt % or more. Yields of heavy, lower value tar and gas oil products increase as the feed hydrogen content decreases.

TABLE 1

Mild Severity Coking of Vacuum Resids with Variable Quality

| Initial Vacuum Resid Feed | A | B | C |
|---|---|---|---|
| API* | 5.4 | 9.8 | 16.5 |
| % H | 10.18 | 11.21 | 12.16 |
| Conditions | | | |
| Unit pressure psig (kPa) | 3 (20.7) | 20 (137.9) | 20 (137.9) |
| Avg Temp of Coke Bed °F. (°C.) | 820 (438) | 800 (427) | 824 (440) |
| Yield wt % | | | |
| $H_2S$ | 0.58 | 0.68 | 0.20 |
| Methane | 2.10 | 2.08 | 1.77 |
| Other $C_4^-$ | 4.10 | 4.90 | 5.20 |
| Naphtha ($C_5^-$, 400° F. (204° C.)) | 11.61 | 15.75 | 18.83 |
| Distillate (400° F.-650° F. (204-343° C.)) | 19.67 | 21.53 | 23.69 |
| Bottom (650° F.$^+$ (343° C.)) | 38.38 | 24.38 | 17.41 |
| Coke | 23.57 | 24.38 | 17.41 |
| Hydrogen Content | | | |
| Naphtha (400° F.$^-$ (204° C.$^-$)) | 13.7 | 14.1 | 14.2 |
| Distillate (400° F.-650° F. (204-343° C.)) | 12.5 | 12.64 | 13.2 |
| Bottom (650° F.$^+$ (343° C.)) | 11 | 11.8 | 12.3 |

*API = American Petroleum Institute gravity in degrees

TABLE 2

Steam Cracking Yields for Wide Cut Coker Liquids Estimated Using Steam Cracker Process Simulation Model

| Initial Vacuum Resid Feed | A | B | C |
|---|---|---|---|
| API | 5.4 | 9.8 | 16.5 |
| SC Yields wt % | | | |
| Ethylene Plus Propylene Plus C4 Yields | 28.4 | 33.9 | 38.6 |
| TAR (C17+) | 26.7 | 18.0 | 13.9 |

Unless otherwise specified, the meanings of terms used herein shall take their ordinary meaning in the art; reference shall be taken, in particular, to Handbook of Petroleum Refining Processes, Third Edition, Robert A. Meyers, Editor, McGraw-Hill (2004). In addition, all priority documents, patents, patent applications, test procedures (such as ASTM methods), and other documents cited herein are fully incorporated by reference to the extent such disclosure is not inconsistent with this invention and for all jurisdictions in which such incorporation is permitted. Also, when numerical lower limits and numerical upper limits are listed herein, ranges from any lower limit to any upper limit are contemplated.

The invention has been described above with reference to numerous embodiments and specific examples. Many variations will suggest themselves to those skilled in this art in light of the above detailed description. All such obvious variations are within the full intended scope of the appended claims.

What is claimed is:

1. A system for cracking hydrocarbon feedstock containing vacuum resid comprising:
    a) a first thermal conversion zone operating at a temperature of less than 649° C., wherein the first thermal conversion zone is a fluid coker, comprising:
        i) a fluidized bed gasifier,
        ii) a transfer line reactor comprising a hydrocarbon feed inlet in fluid communication with a lower portion of a vapor/liquid separator, and a pyrolysis product outlet line,
        iii) a solids conduit connecting a lower portion of said fluidized bed gasifier with said transfer line reactor, and
        iv) at least one cyclone separator having an inlet connected to said pyrolysis product outlet line, a cracked product outlet at a top portion of said cyclone separator, and a solids outlet at the bottom of said cyclone separator;
    said first thermal conversion zone in fluid communication with b) a steam cracking furnace, the a vapor/liquid separator being in fluid communication with said furnace.

2. The system of claim 1, further comprising a second a vapor/liquid separator in fluid communication with said thermal conversion zone.

3. The system of claim 1, further comprising an air/steam inlet at the bottom of said fluidized bed gasifier.

4. The system of claim 1, wherein said fluidized coker further comprises a fluidized bed heater vessel, having recirculating solids conduits connecting lower portions of said heater vessel and said gasifier, and at least one gas conduit connected between an upper portion of said gasifier and the lower portion of said heater vessel.

5. The system of claim 1, wherein said cyclone separator solids outlet is connected to either or both of said fluidized bed gasifier or said heater vessel.

6. The system of claim 1, comprising two solids conduits connecting lower portions of said heater vessel and said gasifier.

7. The system of claim 1, wherein said transfer line reactor is a vertical riser reactor, wherein said solids conduit and said hydrocarbon feed inlet are connected to a lower portion of said reactor.

8. The system of claim 1, wherein said transfer line reactor is a downflow reactor wherein said solids conduit and said hydrocarbon feed inlet are connected to an upper portion of said reactor.

* * * * *